United States Patent [19]
Mino et al.

[11] Patent Number: 5,234,718
[45] Date of Patent: Aug. 10, 1993

[54] METHOD OF MANUFACTURING A CHEMICALLY ADSORBED FILM

[75] Inventors: Norihisa Mino, Settu; Yoshikazu Yamagata, Moriguchi; Kazufumi Ogawa, Hirakata, all of Japan

[73] Assignee: Matsushita Electric Industrial Co., Ltd., Osaka, Japan

[21] Appl. No.: 836,420

[22] Filed: Feb. 18, 1992

[30] Foreign Application Priority Data

Feb. 19, 1991 [JP] Japan ................. 3-047747

[51] Int. Cl.⁵ .................................. B05D 3/10
[52] U.S. Cl. .................... 427/352; 427/430.1; 427/435
[58] Field of Search ............ 427/430.1, 352, 435

[56] References Cited

U.S. PATENT DOCUMENTS

| | | | |
|---|---|---|---|
| 4,199,330 | 4/1980 | Nestrick et al. | 55/67 |
| 4,243,701 | 9/1981 | Riley et al. | 427/430.1 |
| 4,539,061 | 9/1985 | Sagiv | 427/407.1 |
| 4,751,171 | 6/1988 | Ogawa | 430/299 |
| 4,968,524 | 11/1990 | Ogawa et al. | 427/36 |
| 5,143,750 | 9/1992 | Yamagata et al. | 427/57 |

FOREIGN PATENT DOCUMENTS

| | | |
|---|---|---|
| 0386784 | 9/1990 | European Pat. Off. |
| 0492417 | 7/1992 | European Pat. Off. |
| 0492545 | 7/1992 | European Pat. Off. |
| 0499977 | 8/1992 | European Pat. Off. |

Primary Examiner—Michael Lusigan
Assistant Examiner—Erma Cameron
Attorney, Agent, or Firm—Fish & Richardson

[57] ABSTRACT

A method of manufacturing a chemically adsorbed monomolecular or polymer film by a dehydrochlorination reaction brought about by contacting a substrate having hydrophilic groups at the surface with a non-aqueous organic solvent containing a compound having a halogen-based functional group able to react with a hydrophilic group at one end is disclosed. A basic compound is present in the non-aqueous organic solvent. Molecules having a functional group able to react with a hydrophilic group at one end are dissolved in the solvent obtained by adding the basic compound to the non-aqueous organic solvent. The substrate is contacted with the solution to form a chemically adsorbed monomolecular or polymer film. The film is formed efficiently and in a short period of time.

22 Claims, 1 Drawing Sheet

METHOD OF MANUFACTURING A CHEMICALLY ADSORBED FILM

FIELD OF THE INVENTION

This invention relates to a method of manufacturing a chemically adsorbed film. More particularly, the invention relates to a method of efficiently forming a chemically adsorbed monomolecular and/or polymer film as a surface film. The method can be used in the fields of glass, metal, ceramic, plastic, semiconductor, etc., manufacturing.

BACKGROUND OF THE INVENTION

Non-aqueous organic solvents which are used to dissolve molecules containing a functional group, which react with a hydrophilic group at one end (hereinafter referred to as surface active material), are prepared by refining commercially available solvents and preserved with added drying agents. Those solvents which have been preserved should be refined before use. Further, when the surface active material is dissolved in the solvent, the drying agent is removed.

In a further aspect, while a monomolecular film is formed on a substrate containing hydrophilic groups at the surface with a dehydrohalogen (i.e., hydrochloric acid) removal reaction (dehydrohalogenation reaction) brought about by dipping the substrate in a non-aqueous organic solvent with a surface active material dissolved therein. In such a case no catalyst for promoting the reaction is added.

The principle of production of a chemically adsorbed monomolecular film is to form a monomolecular film by utilizing a dehydrohalogenation reaction between hydroxyl or like hydrophilic groups at a substrate surface and chlorosilyl or like functional groups at one end of a surface active material.

Therefore, if water molecules are present in the non-aqueous organic solvent with the surface active material dissolved therein, they react with the surface active material which results in gel polymerization of the surface active material, thereby causing inadequate monomolecular film formation. Further, in the prior art method of forming a chemically adsorbed monomolecular film, a molecular sieve or like drying agent is added to refine the non-aqueous organic solvent and removed right before dissolving the surface active material. Therefore, it is important to prevent the drying agent from being introduced into the solvent.

In a further aspect, in forming the monomolecular film, halohydrogen is generated in the solvent. It has been thought that halohydrogen is only slightly generated compared to the amount of the solvent and surface active material and that it does not substantially affect the reaction. However, it is thought to be generated on the substrate surface and thus partly increase its concentration at the substrate surface. Actually, in the last stage of the monomolecular film formation, the rate of formation is considerably reduced, and a long time is required until formation of the monomolecular film is complete.

An object of the invention is to provide a method, which can prevent halohydrogen concentration increase during film formation accompanying a halohydrogen removal reaction and permits simplification of operation. This would permit a chemically adsorbed monomolecular film to be efficiently obtained in a short period of time and give a solution to the prior art problem.

SUMMARY OF THE INVENTION

The primary objective of this invention is to provide a method of forming a chemically adsorbed monomolecular film on the surface of a substrate, wherein the surface contains active hydrogen groups, the method comprising:

(A) preparing a chemical adsorbing material solution by dissolving a chemical adsorbing material in a non-aqueous organic solvent, the chemical adsorbing material having halogen-based functional molecular groups capable of reacting with the active hydrogen groups on the substrate surface, wherein a basic compound is present in the non-aqueous organic solvent;

(B) dipping the substrate in the chemical adsorbing material solution, thereby adsorbing of the chemical adsorbing material to the substrate surface; and (C) washing non-reacted chemical adsorbing material away from the substrate surface using a non-aqueous organic solution.

Another objective of this invention is to provide a method of forming a chemically adsorbed polymer film on the surface of a substrate, wherein the surface of the substrate contains active hydrogen groups, the method comprising:

(a) preparing a chemical adsorbing material solution by dissolving a chemical adsorbing material in a non-aqueous organic solvent, the chemical adsorbing material having halogen-based functional molecular groups capable of reacting with the active hydrogen groups on the substrate surface, wherein a basic compound is present in the non-aqueous organic solvent;

(b) dipping the substrate in the chemical adsorbing material solution in a dry atmosphere thereby adsorbing the chemical adsorbing material to the substrate surface;

(c) forming on the substrate an adsorbed precursor film having a compound containing a silanol group by reacting the chlorosilane groups with water after the dipping step; and (d) drying the adsorbed precursor film.

It is preferable in this invention that the basic compound present in the non-aqueous organic solvent is a dehydrating compound.

It is preferable in this invention that the basic compound comprises a tertiary amine or anhydrous carbonate.

It is preferable in this invention that the tertiary amine is pyridine or dimethylaniline.

It is preferable in this invention that the anhydrous carbonate is anhydrous calcium carbonate, anhydrous sodium carbonate, or anhydrous potassium carbonate.

It is preferable in this invention that the concentration of the basic compound in the non-aqueous organic solvent is in a range of $10^{-3}$ to 1 mol/l.

It is preferable in this invention that the molecular groups of the chemical adsorbing material comprise at least one member selected from the group consisting of a halogenated silyl (-SiX) group, a halogenated titanyl (-TiX) group, a halogenated stannyl (-SnX) group, where X represents chlorine, bromine, fluorine or iodine.

It is preferable in this invention that the chemical adsorbing material comprises an end functional chlorosilyl (-SiCl) group and a fluorocarbon group.

It is preferable in this invention that the concentration of the chemical adsorbing material in the non-aqueous organic solvent is in a range of $10^{-4}$ to $10^{-1}$ mol/l.

It is preferable in this invention that the substrate comprise material selected from the group consisting of glass, metals, ceramics, plastics and semiconductors.

It is preferable in this invention that the substrate is an oxidation treated plastic substrate.

According to the invention, a basic compound is added to a non-aqueous organic solvent with a chemically absorbed material dissolved therein for removing halohydrogen generated in a film formation reaction by reacting it with the basic compound, thus promoting the film formation reaction.

By using a basic dehydrating agent as the basic compound, it is possible to suppress the polymerization reaction of the surface active material while removing halohydrogen generated in the film formation reaction by reacting with the basic dehydrating agent. This simplifies of the operation of removing the drying agent in the film formation process and promotes of the film formation reaction.

DETAILED DESCRIPTION OF THE INVENTION

Figure 1:
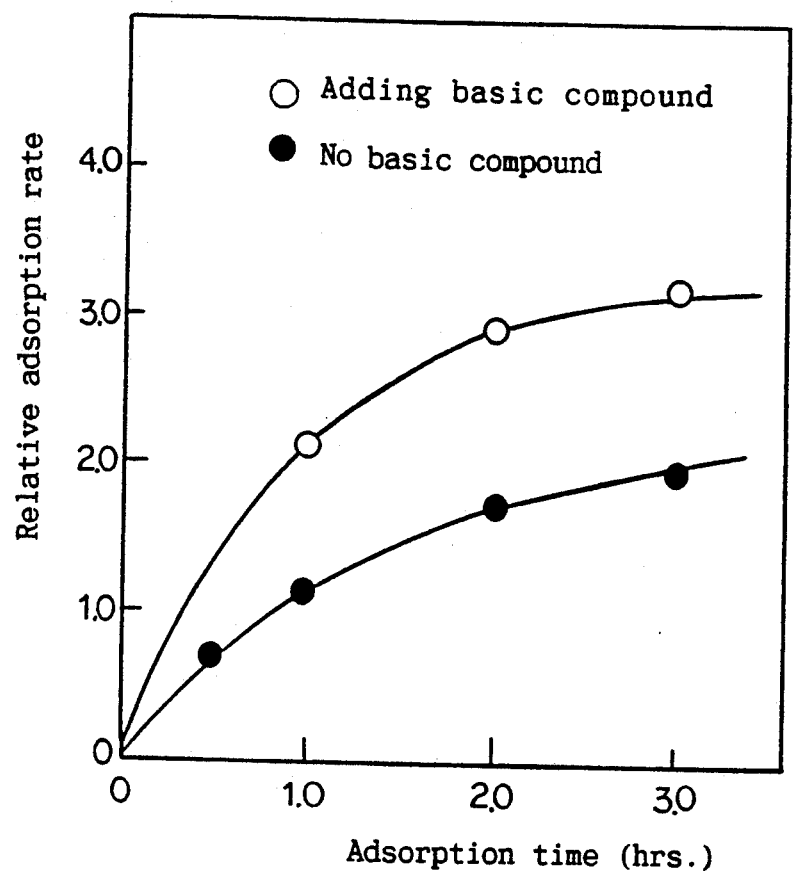
FIG. 1 is a schematic view showing the adsorption rate of the embodiment of the invention.

The invention concerns a method of manufacturing a chemically adsorbed monomolecular film which a basic compound is added to a non-aqueous organic solvent to dissolve molecules having functional groups which are able to react with hydrophilic groups.

According to the invention, a method of manufacturing a chemically adsorbed monomolecular film by a dehydrohalogenation reaction is brought about by contacting a substrate having hydrophilic groups at the surface with a non-aqueous organic solvent containing a compound having a halogen-based functional groups able to react with the hydrophilic groups. A basic compound is present in the non-aqueous organic solvent.

Molecules having functional groups able to react with hydrophilic groups are dissolved in the solvent obtained by adding the basic compound to the non-aqueous organic solvent. The substrate is contacted with the solution thus prepared, whereby a chemically adsorbed monomolecular film is formed efficiently and in a short period of time. Halohydrogen is generated by a halohydrogen removal reaction, but it is neutralized by pyridine, dimethylaniline and other tertiary amines thus promoting the film formation reaction.

According to the invention, a basic compound is added to a non-aqueous organic solvent with a chemically adsorbed material dissolved therein. The basic compound removes halohydrogen generated in a film formation reaction, thus promoting the film formation reaction.

By using a basic dehydrating agent as the basic compound, it is possible to suppress the polymerization reaction of the surface active material while removing halohydrogen generated in the film formation reaction. This simplifies the operation of removing the drying agent in the film formation process and also promotes the film formation reaction.

The invention is suitably carried out by preparing a non-aqueous organic solvent containing molecules having a functional groups able to react with hydrophilic groups and a basic compound; and dipping a substrate containing hydrophilic groups at the surface in the solvent.

The basic compound that can be used according to the invention preferably does not react with the non-aqueous organic solvent and does not produce molecules containing hydrophilic groups by a reaction of halohydrogen such as hydrochloric acid, hydrobromic acid or hydrofluoric acid. Examples are pyridine, dimethylaniline and other tertiary amines.

Among the basic compounds capable of use according to the invention, basic drying agents which act as dehydrating agents preferably do not contain any hydrophilic groups and do not produce any molecules having hydrophilic groups as a result of a dehydrating reaction.

Examples are anhydrous calcium carbonate, anhydrous sodium carbonate, anhydrous potassium carbonate and other anhydrous carbonates. The concentration of the basic compound in the solvent varies depending upon the water content of the solvent, the density of hydrophilic groups present at the substrate surface and so forth. The water content of the solvent is preferably $10^{-3}$ to 1 vol. %, more preferably $10^{-1}$% by volume. If the solvent is strongly basic, the substrate or surface active material may be attacked. In such a case, concentration should be as low as possible to permit reaction between water molecules and halohydrogen.

The surface active material capable of use according to the invention contains a functional group able to chemically react with a hydrophilic group. Examples of the functional group are chlorosilyl ($-SiCl_nX_{3-n}$) group, chlorotitanyl ($-TiCl_nX_{3-n}$) group, chlorostannyl ($-SnCl_nX_{3-n}$) group, where n represents 1, 2 or 3, X represents a hydrogen atom or a substituted group such as a lower-alkyl or lower-alkoxyl group, and other molecules containing active chlorine. The other end of the molecule may be contain an organic group such as an alkyl, cycloalkyl or allyl group, for example a compound having a fluorocarbon group.

According to the invention, any substrate may be used which contains $-OH$, $-COOH$, $-NH_2$, $=NH$ or other hydrophilic groups at its surface. Examples of these materials are various glass compound such as quartz glass, crystal glass and metalized glass, metals such as aluminum, iron, stainless steel and titanium, semiconductors such as silicon and germanium and plastics such as polypropylene, polystyrene, polyethylene, acryl resin and nylon. A substrate containing relatively few hydroxyl groups at the surface, may be chemically treated by means such as ozone oxidation, plasma treatment, corona treatment, or electron beam irradiation to obtain a substrate containing increased hydrophilic groups and which are suitable for the invention. Polyamide resins and polyurethane resins have surface imino groups ($=NH$) and therefore do not require any pre-treatment.

Since the surface active material reacts with water, the non-aqueous organic solvent to be used according to the invention may have as low a water content as possible, does not attach to the substrate and sufficiently dissolves the surface active material. Examples are those solvents which have long chain alkyl groups, aromatic hydrocarbons, alicyclic hydrocarbons and halogen-containing hydrocarbons.

The concentration of the film formation solution according to the invention can be varied depending upon the density of hydrophilic groups present at the substrate surface, the surface area thereof and so forth. If the concentration is significantly low, the rate of film formation is low. On the other hand, by increasing the concentration or the number of hydrophilic groups at the substrate surface the rate of film formation is not substantially changed. In the latter stage of chemical adsorption a monomolecular film which has been previously formed by preferential adsorption is cleared by molecules adsorbed to remaining hydrophilic groups at the substrate surface. Since this clearing occurs, the time until a densely adsorbed state is obtained is not substantially increased by the concentration. Sufficient concentration of the film formation solvent, is about $10^{-4}$ mol/l or above, preferably $10^{-3}$ mol/l or above.

According to the invention, the substrate containing hydrophilic groups at the surface may be contacted with the non-aqueous organic solvent by any suitable means, e.g., dipping, spraying, brushing, blowing and spin coating.

Alternative pre-treatment means are available to prepare the surface of substrates such as glass, metals, ceramics and plastics, silica ($SiO_2$), and in the pre-treatment step such substances are deposited. Polyhalogenated silane such as dichlorosilane, trichlorosilane or tetrachlorosilane is coated and reacted with water. The pre-treatment can be with or without washing with a non-aqueous solution and increases the formation of silanol (-SiOH) groups on the substrate surface. By so doing, the chemical adsorbing material can be reacted in a high concentration.

According to the invention, any organic solvent may be used so long as it is a non-aqueous organic solvent, does not attack the substrate and permits sufficient dissolution of the chemical adsorbing material, since the chemical adsorbing material is reacted with hydrous molecules. Examples of the organic solvent are long chain alkyl-based solvents, aromatic hydrocarbon-based solvents, aliphatic hydrocarbon-based solvents and halogen-containing solvents.

The concentration of the chemical adsorbing material solution is varied depending on the concentration of hydrophilic groups present on the substrate surface or the surface area of the substrate. If the concentration is significantly low, the adsorption speed is low. On the other hand, if the concentration is excessive, the number of molecules preferentially chemically adsorbed onto the hydrophilic groups at the substrate surface and the adsorption speed are not effected. In addition, the already preferentially adsorbed monomolecular film is advantageously assisted by molecules that are adsorbed to non-adsorbed hydrophilic groups remaining on the substrate surface in the final stage of adsorption. Because of this assistance, the time until reaching a high concentration adsorbed state is not significantly effected. Therefore, it is preferred that the concentration of chemical adsorbing material solution is about $10^{-4}$ mol/l or above, more preferably $10^{-3}$ mol/l or above. The most preferred upper limit is $10^{-1}$ mol/l.

To form only a single chemically adsorbed monomolecular film (i.e., non polymer film) according to the invention, it is necessary to carry out after the monomolecular film formation step a washing step, in which unreacted molecules remaining on the monomolecular film are washed away without water. As a method of washing, ultrasonic waves can be applied to a washing solution, or by continuous over-flow of the washing solution, or by renewing the washing solution several times.

Examples of the chemical adsorbing material to be used suitably according to the invention are such as followes; $CF_3(CH_2)_2Si(CH_3)_2(CH_2)_{15}SiCl_3$, $F(CF_2)_4(CH_2)_2Si(CH_3)_2(CH_2)_9SiCl_3$, $CF_3CH_2O(CH_2)_{15}SiCl_3$, $CF_3COO(CH_2)_{15}SiCl_3$, $CF_3(CF_2)_9(CH_2)_2SiCl_3$, $CF_3(CF_2)_7(CH_2)_2SiCl_3$, $CF_3(CF_2)_5(CF_2)_2SiCl_3$, $CF_3(CF_2)_7(CF_2)_2SiCl_3$, and $CF_3CH_2O(CH_2)_{15}SiCl_3$ etc.

According to the invention ultrasonic waves can be used in the monomolecular and/or polymer film formation step to reduce the adsorption time for formation of the adsorbed film. Further, with the method according to the invention, the chemical adsorbing material can be adsorbed at a high concentration compared to the known chemically adsorbed films. Thus, it is possible to form a film substantially free from pin holes (substantially pin-hole free) and obtain more stabilized and improved physical and chemical properties of the film. Further, it is possible to improve the orientation of the adsorbed molecules.

The invention is applicable to various fields.

The invention can be widely applied to the following materials. Materials made of metals, ceramics or plastics, woods and stones etc. can be used as the substrate. The surface of the substrate can also be coated with paint or the like.

Examples of cutlery: a kitchen knife, scissors, a knife, a cutter, a graner, a razor, hair clippers, a saw, a plane, a chisel, a gimlet, a badkin, a bite (cutting tools), the edge of a drill, the edge of a mixer and juicer, a blade of a mill, a blade of a lawnmower, a punch, a straw cutter, a staple, a can opener or a surgical knife and the like.

Examples of needles: an acupuncture needle, a sewing needle, a matting needle, an injection needle, a surgical needle, a safety pin and the like.

Examples of products in the pottery industry: products made of a pottery, glass, ceramics or enameled products such as sanitary pottery (a chamber pot, a wash-bowl, a bathtub etc.), tableware (a rice-bowl teacup, a dish (plate), a bowl, a teacup, a glass, a bottle, a coffee-pot (siphon), a pan, an earthenware mortar, a cup and (the like), vases (a flower bowl, a flowerpot, a bud vase and the like), water tanks (a breeding cistern, an aquarium water tank and the like), chemical experiment appliances (a beaker, a reactor vessel, a test tube, a flask, a laboratory dish, condenser, a mixing rod, stirrer, a mortar, a bat, a syringe etc.) a roof tile, enameled ware, an enameled washbowl, and an enameled pan and the like.

Examples of mirrors: a hand mirror, a full-length mirror, a bathroom mirror, a lavatory mirror, vehicle mirrors(a rear-view mirror, a side mirror, a door mirror etc.), half mirror, road mirrors such as a curved mirror, a show window glass, a salesroom window in a department store, medical care mirrors, a concave mirror, a convex mirror and the like.

Examples of molding parts: dies for press molding, dies for cast molding, dies for injection molding, dies for transfer molding, dies for compression molding, dies for transfer molding, dies for inflation molding, dies for vacuum molding, dies for blow forming, dies for extrusion molding, dies for fiber spinning, a calender processing roll and the like.

Examples of ornaments: a watch, a jewel, a pearl, a sapphire, a ruby, an emerald, a garnet, a cat's eye, a diamond, a topaz, a bloodstone, an aquamarine, a turquoise, an agate, a marble, an amethyst, a cameo, an opal, a crystal, a glass, a ring, a bracelet, a brooch, a tiepin (a stickpin), an earring, a necklace, jewelry made of platinum, gold, silver, copper, aluminum, titanium, tin and alloys thereof, stainless steel, a glass frame and the like.

Examples of forming molds for food: cake, cookies, bread-baking, chocolate, jelly, ice cream, ovenware, ice trays and the like.

Examples of cookware: kitchen utensils (a pan and a pot), a kettle, a pot, a frying-pan, a hot plate, a toasting net, a takoyaki plate and the like.

Examples of papers: photogravure paper, hydrophobic and oilphobic paper, poster paper, high-grade pamphlet paper, wrapping paper, package paper, drinking package paper, container paper, printing paper, synthetic insulating paper and the like.

Examples of resin(s): a polyolefin such as a polypropylene and polyethylene, a polyvinylchloride plastic, a polyamide, a polyimide, a polyamideimide, a polyester, an aromatic polyester, a polycarbonate, a polystyrene, a polysulfide, a polysulfone, a polyethersulfone, a polyphenylenesulfide, a phenolic resin, a furan resin, a urea resin, an epoxy resin, polyurethane, a silicon resin, an ABS resin, a methacrylic resin, an acrylate resin, a polyacetal, a polyphenylene oxide, a poly methylpentene, a melamine resin, an alkyd resin, an unsaturated polyester cured resin and the like.

Examples of rubber: styrene-butadiene rubber, butyl rubber, nitril rubber, chloroprene rubber, polyurethane rubber, silicon rubber and the like.

Examples of household electrical appliances: a television, a radio, a tape recorder, an audio player, a television, a radio, a tape recorder, an audio player, a compact disc (CD), a refrigerator, a freezer, an air conditioner, a juicer, a mixer, a blade of an electric fan, a lighting apparatus, a dial plate, a dryer for perms and the like.

Examples of sports articles: skis, fishing rods, poles for pole vaulting, boats, yachts, surfboards, golf balls, bowling balls, fishing line, fishing nets, floats and the like.

The examples applying to vehicle parts:
(1) ABS resin: a lamp cover, an instrument panel, trimming parts, a protector for a motorcycle.
(2) Cellulose plastic: a car mark, a steering wheel
(3) FRP (fiber reinforced plastics): a bumper, an engine cover (jacket)
(4) Phenolic resin: a brake
(5) Polyacetal: wiper gear, a gas valve
(6) Polyamide: a radiator fan
(7) Polyarylate (polycondensation polymerization by bisphenol A and pseudo phthalic acid): a directional indicator lamp or lens, a cowl board lens, a relay case
(8) Polybutylene terephthlate (PBT): a rear end, a front fender
(9) Poly(amino-bismaleimide): engine parts, a gear box, a wheel, a suspension drive system
(10) Methacrylate resin: a lamp cover lens, a meter panel and its cover, center mark
(11) Polypropylene: a bumper
(12) Polyphenylene oxide: a radiator grill, a wheel cap
(13) polyurethane: a bumper, a fender, an instrument panel, a fan
(14) Unsaturated polyester resin: a body, a fuel, tank, a heater housing, a meter panel.

Examples of office supplies: a fountain pen, a ballpoint pen, a propelling pencil (an automatic or a mechanical pencil), a pencil case, a binder, a desk, a chair, a bookshelf, a rack, a telephone stand table, a rule (measure), a drawing instrument and the like.

Examples of building materials: materials for a roof, an outer wall and interiors. Roof materials such as a brick, a slate and a tin (a galvanized iron sheet) and the like. Outer wall materials such as wood (including a processed manufactured wood), mortar, concrete, ceramics sizing, a metalic sizing, a brick, a stone, plastics and a metal like aluminium. Interior materials such as a wood (including a processed wood), metal such as aluminium, plastics, paper, fiber and the like.

Examples of building stone: granite, marble and others used for such as a building, a building material, an architectured fixture, an ornament, a bath, a grave, a monument, a gatepost, a stone wall, a paving stone and the like.

Examples of musical instruments and sound apparatus: a percussion instrument, a stringed instrument, a keyboard instrument, a woodwind instrument, brass and others, and sound apparatus such as a microphone and a speaker. To be specific, there are musical instruments such as a drum, a cymbal, a violin, a cello, a guitar, a koto (harp), a piano, a flute, a clarinet, a bamboo flute and a horn, and sound apparatus such as a microphone, a speaker and an ear-phone and the like.

Other examples include a thermos bottle, a vacuum bottle, a vacuum vessel and the like.

EXAMPLE 1

Pyridine was used as the basic compound.

That is, pyridine was added at 0.1% by volume to a non-aqueous organic solvent in dry air. The non-aqueous organic solvent was a blend solvent composed of 80% by weight of normal hexadecane, 12% by weight of chloroform and 8% by weight of carbon tetrachloride. The individual organic solvents were commercially available and refined before use. Then 10 mmol/l of nonadecyl-trichlorosilane $CH_3(CH_2)_{18}SiCl_3$ was dissolved as the surface active material in the solution at 30° C. A glass substrate was dipped and held in the solution to cause formation of a chemically adsorbed film. Adsorption of the surface active material to hydroxyl groups at the glass substrate surface generated hydrochloric acid by a dehydrochlorination reaction. The hydrochloric acid then reacted with pyridine to produce a salt.

In this way, the dehydrochlorination reaction between hydroxyl groups at the substrate surface and the surface active material was promoted. Eventually, there were no unreacted hydroxyl groups at the substrate surface, and an adsorbed film could be efficiently formed.

The chlorosilyl (—SiCl) groups of the chlorosilane-based chemical adsorbing material and the hydroxy (—OH) groups present on the surface of the substrate reacted by a dehydrochlorination reaction to form covalent bonds as shown by the formula 1.

[Formula 1]

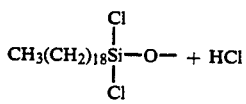

The glass was washed by chloroform to remove the material remaining on the surface without reaction, followed by providing water to the surface of the treated substrate or by contacting the surface to humidified air, chemical bonds were formed bonds as shown by the formula 2.

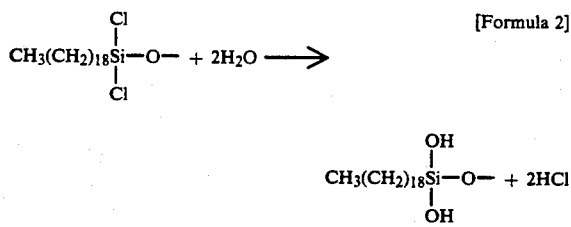

Silanol (—SiOH) groups were reacted by dehydration condensation with adjacent silanol (—SiOH) groups to form bonds as shown by the formula 3.

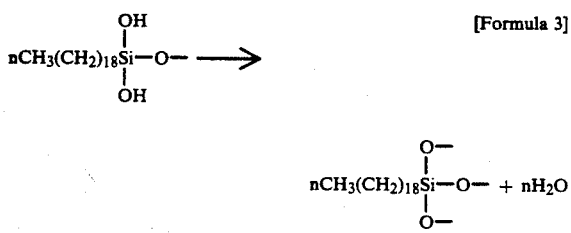

With this series of operations, an organic coating film comprising nonadecyl-trichlorosilane was formed on the silicon substrate. It had a thickness corresponding to the molecular length of the surface active material (i.e., 2.5 nm).

For the sake of comparison, a chemically adsorbed monomolecular film was formed as in the prior art method, i.e., in the same manner as in Example 1 except that the basic compound was not added.

The ratio of adsorption of the surface active material to the substrate was evaluated by FTIR apparatus. FIG. 1 shows the relation between the time of adsorption and amount of adsorbed material. The symmetrical stretching/contraction vibrations of the methylene (—CH$_2$—) groups and the peak area of the anti-symmetrical stretching/contraction vibrations were measured using infrared absorption spectrum analysis. As seen from FIG. 1, with the basic compound added according to the invention being marked by the white circle, the rate of adsorption was about double that compared to the case of adding no basic compound as marked by the black circle.

As in the above example, 0.1% by volume of pyridine was added as the basic compound to the non-aqueous organic solvent (i.e., blend solvent composed of 80% by weight of normal hexadecane, 12% by weight of chloroform and 8% by weight of carbon tetrachloride). In the solution, 10 mmol/l of nonadecyltrichlorosilane, which was used as the surface active material was dissolved. Then, a substrate was contacted with this solution to form a chemically adsorbed monomolecular film. Hydrochloric acid was generated by a hydrochloric acid removal reaction, but was neutralized by pyridine to promote the film formation reaction.

In this way, a chemically adsorbed monomolecular film can be efficiently formed in a short period of time by dissolving molecules having a functional group able to react with a hydrophilic group at one end in a non-aqueous organic solvent with a basic compound added thereto and contacting a substrate with the solution.

EXAMPLE 2

Anhydrous potassium carbonate was used as the basic compound having a dehydrating function.

More specifically, 1 g/l of anhydrous potassium carbonate was added as the basic drying agent to a non-aqueous organic solvent in dry air. A non-aqueous organic mixture solvent was prepared which was composed of 80% by weight of bicyclohexyl, 12% by weight of chloroform and 8% by weight of carbon tetrachloride. The individual organic solvents were commercially available and refined before use. A slight amount of water which remained in the organic solvent was removed as crystal water of potassium carbonate. Then, 10 mmol/l of nonadecyl-trichlorosilane was dissolved as the surface active material in the solvent. Then, an aluminum substrate was dipped to commence formation of the chemically adsorbed monomolecular film. Hydrochloric acid was generated, but it reacted with potassium carbonate to produce potassium chloride, water and carbon dioxide. The water was removed by contacting with the excess anhydrous potassium carbonate.

In this way, the hydrochloric acid removal reaction between hydroxyl groups at the substrate surface and surface active material was promoted. Eventually, there were no unreacted hydroxyl group at the substrate surface, thus bringing an end to the monomolecular film formation.

For comparison, a chemically adsorbed monomolecular film was formed as in the prior art method, i.e., in the same manner as in Example 2 except that no basic dehydrating agent was added.

The two different chemically adsorbed monomolecular films were analyzed in the same manner as in Example 1. It was found that, with the basic dehydrating agent added according to the invention, the adsorption rate was about 1.5 times that compared to the case of where of no basic compound was added.

EXAMPLE 3

A glass substrate which was hydrophilic but contained relatively few hydroxyl groups was processed. (The same effects are obtainable with metal, ceramics or plastic.) The glass was dipped and held for 30 minutes in a solution prepared by dissolving 1% by weight of a material having a plurality of chlorosilyl groups, e.g., SiCl$_4$, SiHCl$_3$, SiH$_2$Cl$_2$, or Cl(SiCl$_2$O)$_n$Cl$_3$ (where n represents an integer in a range from 1 to 20) in a non-aqueous solvent, i.e., a chloroform solvent. SiCl$_4$ is preferred since it is small in molecular size and active with respect to the hydroxyl groups, thereby making the glass surface uniformly hydrophilic. Pyridine was added by 0.1% by volume to a non-aqueous organic solvent in dry air. A hygrometer was placed in a glove bag which contained the solution. The hygrometer indicated that the relative humidity was about 10%. A dehydrochlorination reaction was brought about on the surface due to some —OH groups being present at the glass surface. A chlorosilane monomolecular film of the material having a plurality of chlorosilyl groups was thus formed.

By using SiCl$_4$ as the material containing a plurality of chlorosilyl groups, molecules represented by formulas 4 and/or 5 were formed.

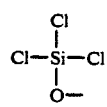

Formula [4]

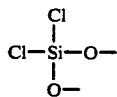

Formula [5]

These molecules were secured via —SiO— bonds to the surface through a dehydrochlorination reaction brought about on the surface due to a small amount of hydrophilic —OH groups being exposed at the surface of the glass substrate. Then, a glass substrate was dipped and held in the solution to cause formation of a chemically adsorbed film. Hydrochloric acid was generated by a dehydrochlorination reaction. However, the hydrochloric acid reacted with pyridine to produce a salt. In this way, the hydrochloric acid removal reaction (i.e., dehydrochlorination reaction) between hydroxyl groups at the substrate surface and the surface active material was promoted. Eventually, there were no unreacted hydroxyl groups at the substrate surface, and an adsorbed film could be efficiently formed.

The substrate was washed with a non-aqueous solvent, e.g., chloroform. A hygrometer placed in a glove bag which contained the solution. The hygrometer indicated that the relative humidity was about 18%. Unreacted $SiCl_4$ molecules were removed by washing with water, and a siloxane monomolecular adsorbed film (inner layer) represented by formulas 6 and/or 7 was formed on the glass surface.

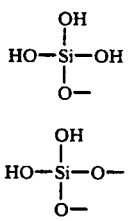

Formula [6]

Formula [7]

The monomolecular film (inner layer) obtained in this way was bonded by chemical bonds of —SiO— to the glass substrate and did not separate. In addition, the substrate surface contained numerous —SiOH bonds, which corresponded to about three times the initial number of hydroxyl groups.

Further, the glass substrate provided with the monomolecular film having numerous —SiOH bonds at the surface, was dipped and held for about one hour in an aqueous solution containing a material having a fluorocarbon group and a chlorosilane group. The solution was prepared by dissolving about 1 wt. % of $CF_3(CF_2)_7(CH_2)_2SiCl_3$ in a solvent containing 80 of n-hexadecane, 12% of carbon tetrachloride and 8% of chloroform. Pyridine was added at 0.1% by volume to the non-aqueous organic solvent in dry air. Bonds of $CF_3(CF_2)_7(CH_2)_2Si(O—)_3$ were formed on the inner layer surface. This reaction proceeded substantially the same as above in formulas [1] to [3]. A fluorine-containing monomolecular film thus was formed. The film was chemically bonded to the inner siloxane monomolecular film. It was formed over the entire glass substrate surface and had a thickness of about 2.1 nanometers. It did not separate in a peel-off test.

A chemically adsorbed monomolecular film can be efficiently formed in a short period of time by dissolving molecules having a functional group able to react with a hydrophilic group at one end in a non-aqueous organic solvent with a basic compound added thereto and contacting a substrate with the resulting solution.

The above procedure was repeated, but the step of washing the substrate using a non-aqueous organic solution was omited. The substrate was treated by washing with water and drying in air. A fluorine-based adsorbed polymer film was formed on the substrate. The fluorocarbon-based polymer film was in satisfactorily close contact with the substrate, was substantially pin-hole free, thin, anti-contaminating and was transparent.

Further, while the above examples were concerned with an organic coating film as a single layer of a surface active material, it is also possible to form a laminated film by preliminarily forming a single layer of organic coating film and then chemically or physically treating the film surface to provide the same by a deoxychlorination reaction.

As has been described in the foregoing, by adding a basic compound to a non-aqueous organic solvent used for the formation of a monomolecular film, it is possible to remove halohydrogen generated by the film formation reaction and reduce the adsorption time compared to that in the prior art monomolecular film formation process. By using a basic dehydrating agent as the basic compound, it is possible to remove water in the organic solvent. Halohydrogen generated in the film formation reaction then can be removed with a single kind of basic dehydrating agent, thus increasing operation efficiency and reducing adsorption time, which is very useful in industrial production.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A method of forming a chemically adsorbed monomolecular film on the surface of a substrate, wherein the surface of the substrate contains active hydrogen groups, the method comprising:

(A) preparing a chemical adsorbing material solution by dissolving a chemical adsorbing material in a non-aqueous organic solvent, said chemical adsorbing material having halogen-based functional molecular groups capable of reacting with the active hydrogen groups on the substrate surface, wherein a basic compound is present in said non-aqueous organic solvent;

(B) dipping the substrate in said chemical adsorbing material solution, thereby adsorbing the chemical adsorbing material to the substrate surface; and (C) washing non-reacted chemical adsorbing material away from the substrate surface using a non-aqueous organic solution.

2. The method of manufacturing a chemically adsorbed monomolecular film according to claim 1, wherein said basic compound present in said non-aqueous organic solvent is a dehydrating solvent.

3. The method of manufacturing a chemically adsorbed monomolecular film according to claim 1 or 2, wherein said basic compound comprises a tertiary amine or anhydrous carbonate.

4. The method of manufacturing a chemically adsorbed monomolecular film according to claim 3, wherein the tertiary amine is pyridine or dimethylaniline.

5. The method of manufacturing a chemically adsorbed monomolecular film according to claim 3, wherein the anhydrous carbonate is anhydrous calcium carbonate, anhydrous sodium carbonate, or anhydrous potassium carbonate.

6. The method of manufacturing a chemically adsorbed monomolecular film according to claim 1, wherein the concentration of said basic compound in said non-aqueous organic solvent is in a range of $10^{-3}$ to 1 mol/l.

7. The method of manufacturing a chemically adsorbed monomolecular film according to claim 1, wherein said molecular groups of said chemical adsorbing material comprise at least one member selected from the group consisting of a halogenated silyl (—SiX) group, a halogenated titanyl (—TiX) group, a halogenated stannyl (—SnX) group, where X represents chlorine, bromine, fluorine or iodine.

8. The method of manufacturing a chemically adsorbed monomolecular film according to claim 1, wherein said chemical adsorbing material comprises an end functional chlorosilyl (—SiCl) group and a fluorocarbon group.

9. The method of manufacturing a chemically adsorbed monomolecular film according to claim 1, wherein the concentration of said chemical adsorbing material in said non-aqueous organic solvent is in a range of $10^{-4}$ to $10^{-1}$ mol/l.

10. The method of manufacturing a chemically adsorbed monomolecular film according to claim 1, wherein the substrate comprises material selected from the group consisting of glass, metals, ceramics, plastics and semiconductors.

11. The method of manufacturing a chemically adsorbed monomolecular film according to claim 1, wherein the substrate is an oxidation treated plastic substrate.

12. A method of forming a chemically adsorbed polymer film on the surface of a substrate, wherein the surface of the substrate contains active hydrogen groups, the method comprising:
(a) preparing a chemical adsorbing material solution by dissolving a chemical adsorbing material in a non-aqueous organic solvent, said chemical adsorbing material having halogen-based functional molecular groups capable of reacting with the active hydrogen groups on the substrate surface, wherein a basic compound is present in said non-aqueous organic solvent;
(b) dipping the substrate in said chemical adsorbing material solution in a dry atmosphere, thereby adsorbing the chemical adsorbing material to the substrate surface;
(c) forming on the substrate an adsorbed precursor film having a compound containing a silanol group by reacting a halogen-based functional molecular group with water after the dipping step; and
(d) drying said adsorbed precursor film.

13. The method of manufacturing a chemically adsorbed polymer film according to claim 12, wherein said basic compound present in said non-aqueous organic solvent is a dehydrating compound.

14. The method of manufacturing a chemically adsorbed polymer film according to claim 12 or 13, wherein said basic compound comprises a tertiary amine or anhydrous carbonate.

15. The method of manufacturing a chemically adsorbed polymer film according to claim 14, wherein the tertiary amine is pyridine or dimethylaniline.

16. The method of manufacturing a chemically adsorbed polymer film according to claim 14, wherein the anhydrous carbonate is anhydrous calcium carbonate, anhydrous sodium carbonate, or anhydrous potassium carbonate.

17. The method of manufacturing a chemically adsorbed polymer film according to claim 12, wherein the concentration of said basic compound in said non-aqueous organic solvent is in a range of $10^{-3}$ to 1 mol/l.

18. The method of manufacturing a chemically adsorbed polymer film according to claim 12, wherein said halogen-based functional molecular group of said chemical adsorbing material comprise at least one member selected from the group consisting of a halogenated silyl (—SiX) group, a halogenated titanyl (—TiX) group, a halogenated stannyl (—SnX) group, where X represents chlorine, bromine, fluorine or iodine.

19. The method of manufacturing a chemically adsorbed polymer film according to claim 18, wherein said chemical adsorbing material comprises an end functional chlorosilyl (—SiCl) group and a fluorocarbon group.

20. The method of manufacturing a chemically adsorbed polymer film according to claim 12, wherein the concentration of said chemical adsorbing material in said non-aqueous organic solvent is in a range of $10^{-4}$ to $10^{-1}$ mol/l.

21. The method of manufacturing a chemically adsorbed polymer film according to claim 12, wherein the substrate comprises material selected from the group consisting of glass, metals, ceramics, plastics and semiconductors.

22. The method of manufacturing a chemically adsorbed polymer film according to claim 12, wherein the substrate is an oxidation treated plastic substrate.

* * * * *